US006606076B2

(12) United States Patent
Burnside et al.

(10) Patent No.: US 6,606,076 B2

(45) Date of Patent: Aug. 12, 2003

(54) REFLECTIVE PANEL FOR WIRELESS APPLICATIONS

(75) Inventors: Walter D. Burnside, Columbus, OH (US); David Steinberger, Columbus, OH (US); Chiwei Chuang, Columbus, OH (US)

(73) Assignee: The Ohio State University, Columbus, OH (US)

( * ) Notice: Subject to any disclaimer, the term of this patent is extended or adjusted under 35 U.S.C. 154(b) by 0 days.

(21) Appl. No.: 09/796,107

(22) Filed: Feb. 28, 2001

(65) Prior Publication Data

US 2001/0026246 A1 Oct. 4, 2001

Related U.S. Application Data

(60) Provisional application No. 60/185,440, filed on Feb. 28, 2000.

(51) Int. Cl.[7] ................................ H04B 7/185

(52) U.S. Cl. ................................ 343/909; 455/428

(58) Field of Search ................................ 343/909, 781 CA, 343/779, 912, 911 R, 700 MS, 846, 847, 848, 849

(56) References Cited

U.S. PATENT DOCUMENTS

| | | | | |
|---|---|---|---|---|
| 4,581,615 A | * | 4/1986 | Levy | 343/755 |
| 5,694,136 A | * | 12/1997 | Westfall | 343/700 MS |
| 6,188,896 B1 | | 2/2001 | Perahia et al. | 455/428 |
| 6,219,003 B1 | * | 4/2001 | Chandler | 343/779 |

* cited by examiner

*Primary Examiner*—James Clinger

(74) *Attorney, Agent, or Firm*—Standley & Gilcrest LLP

(57) ABSTRACT

A reflective panel for deflecting electromagnetic waves comprised of a resistive material varying in resistivity across the panel; a center portion on the panel, having a predetermined resistivity; a periphery portion on the panel having a higher resistivity than the center portion; and wherein the center portion of the panel is adapted to reflect the electromagnetic waves and wherein the periphery portion is adapted to minimize diffractions.

11 Claims, 11 Drawing Sheets

A simple concept of using an Rcard panel to reflect wireless signals streaming down a street into an alley.

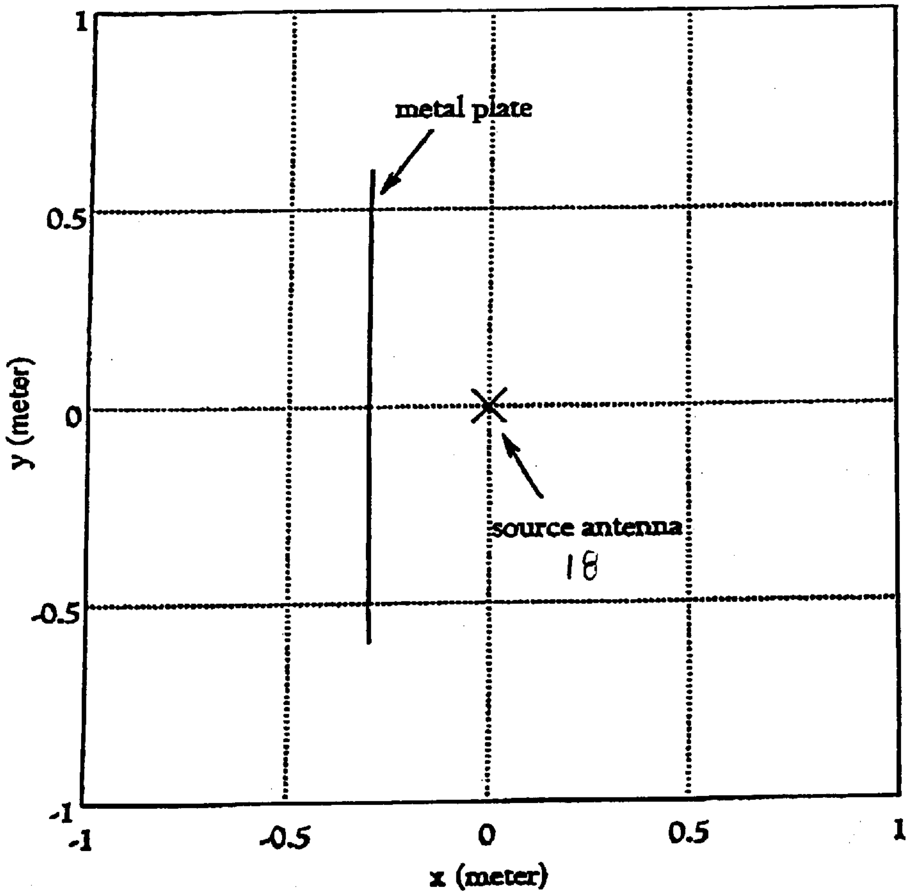
Figure 1. Horizontal plane (*xy*-plane) view of a 1.2 m wide metal plate placed at 0.3 m behind a wireless basestation antenna.

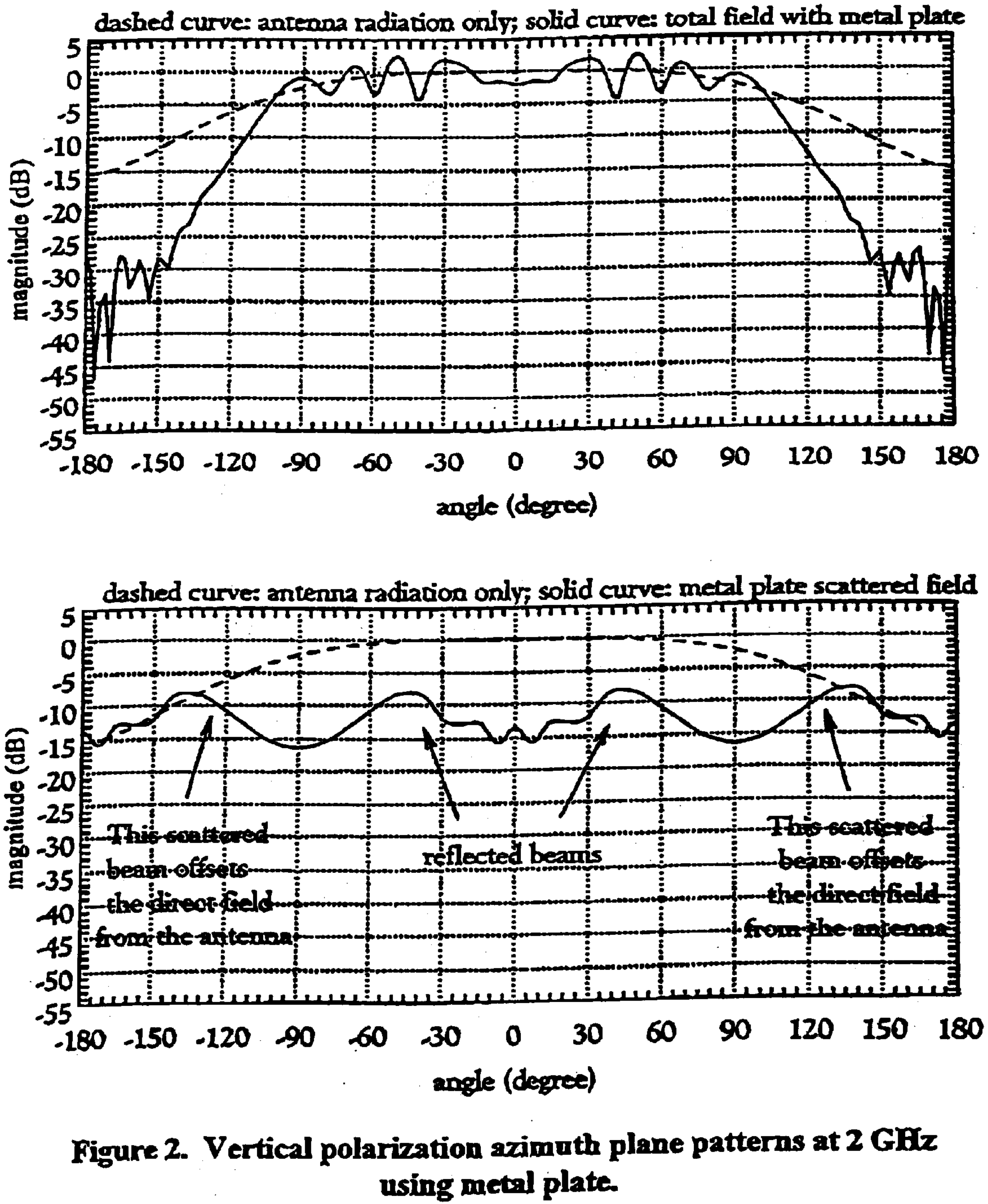
Figure 2. Vertical polarization azimuth plane patterns at 2 GHz using metal plate.

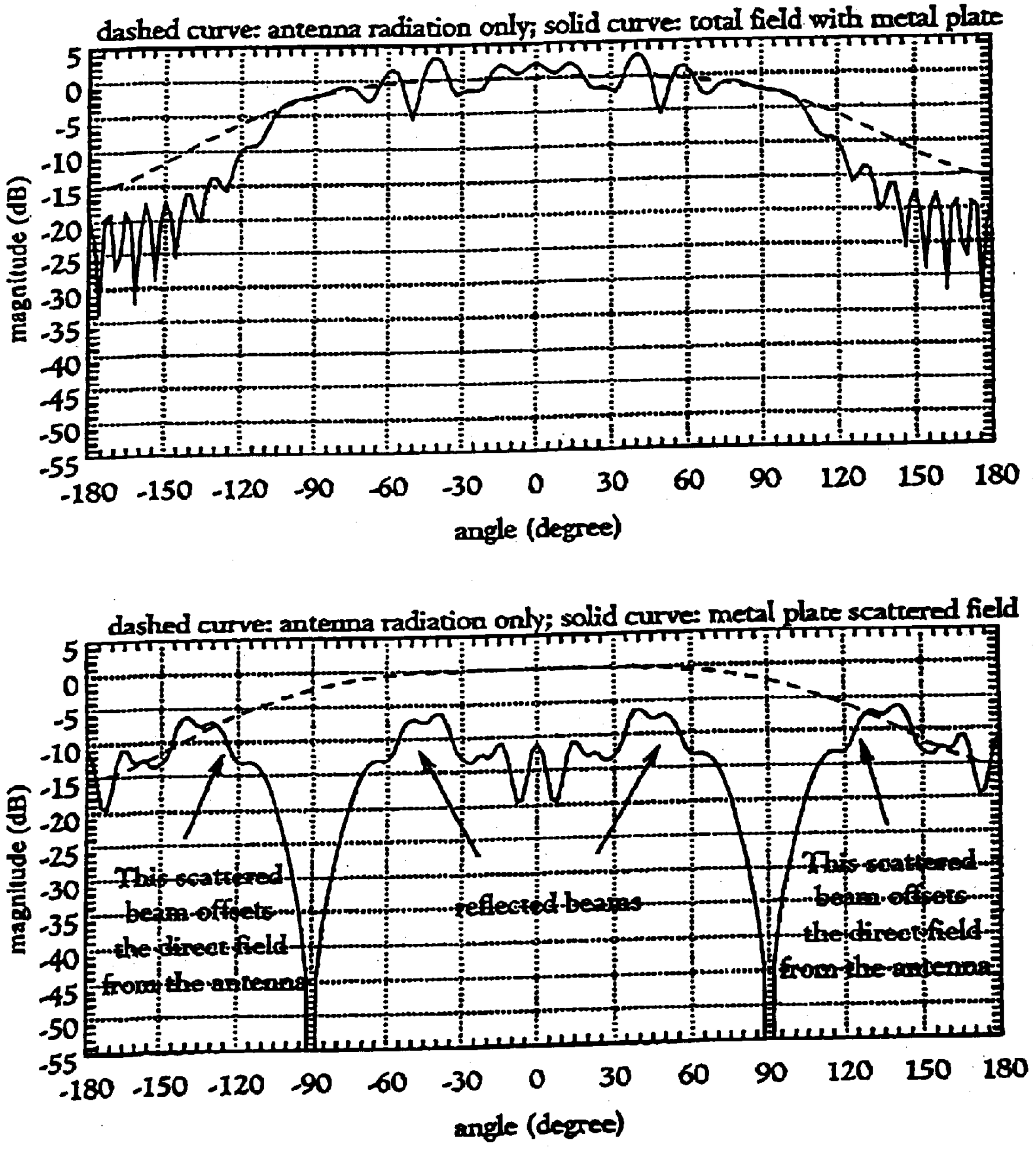
Figure 3. Horizontal polarization azimuth plane patterns at 2 GHz using metal plate.

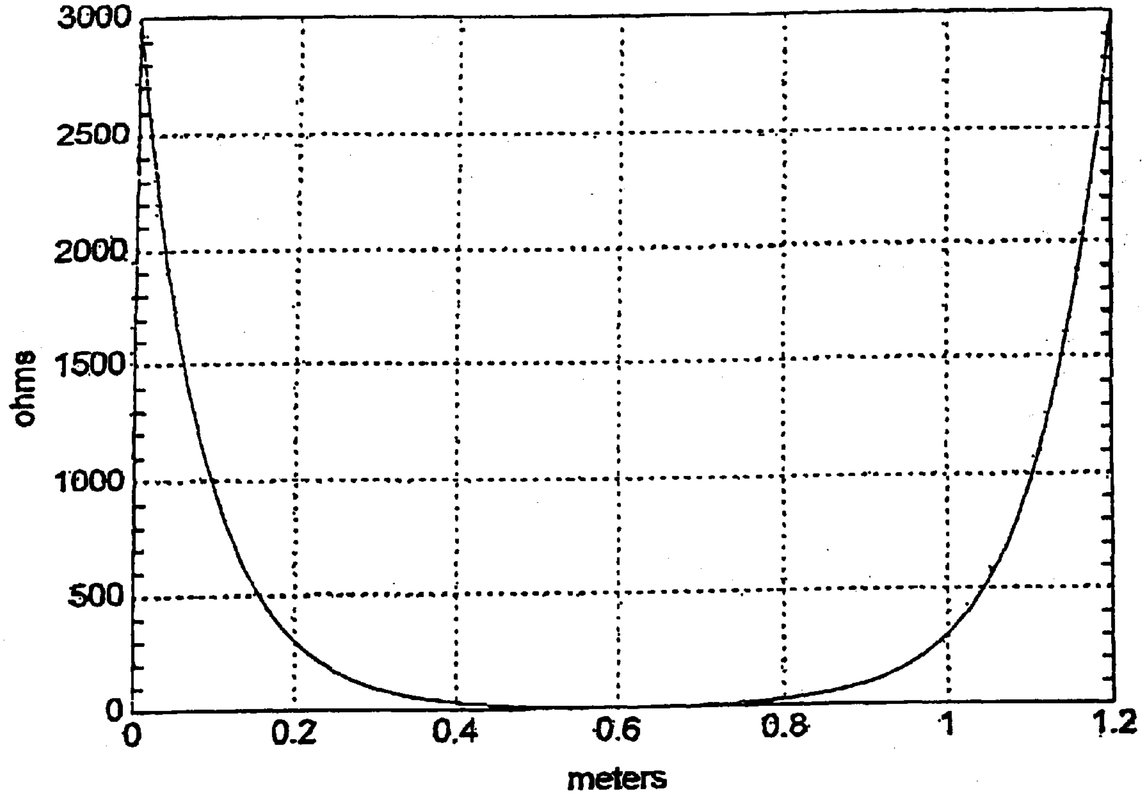
Figure 4. Tapered resistance distribution on a 1.2 m wide Rcard panel.

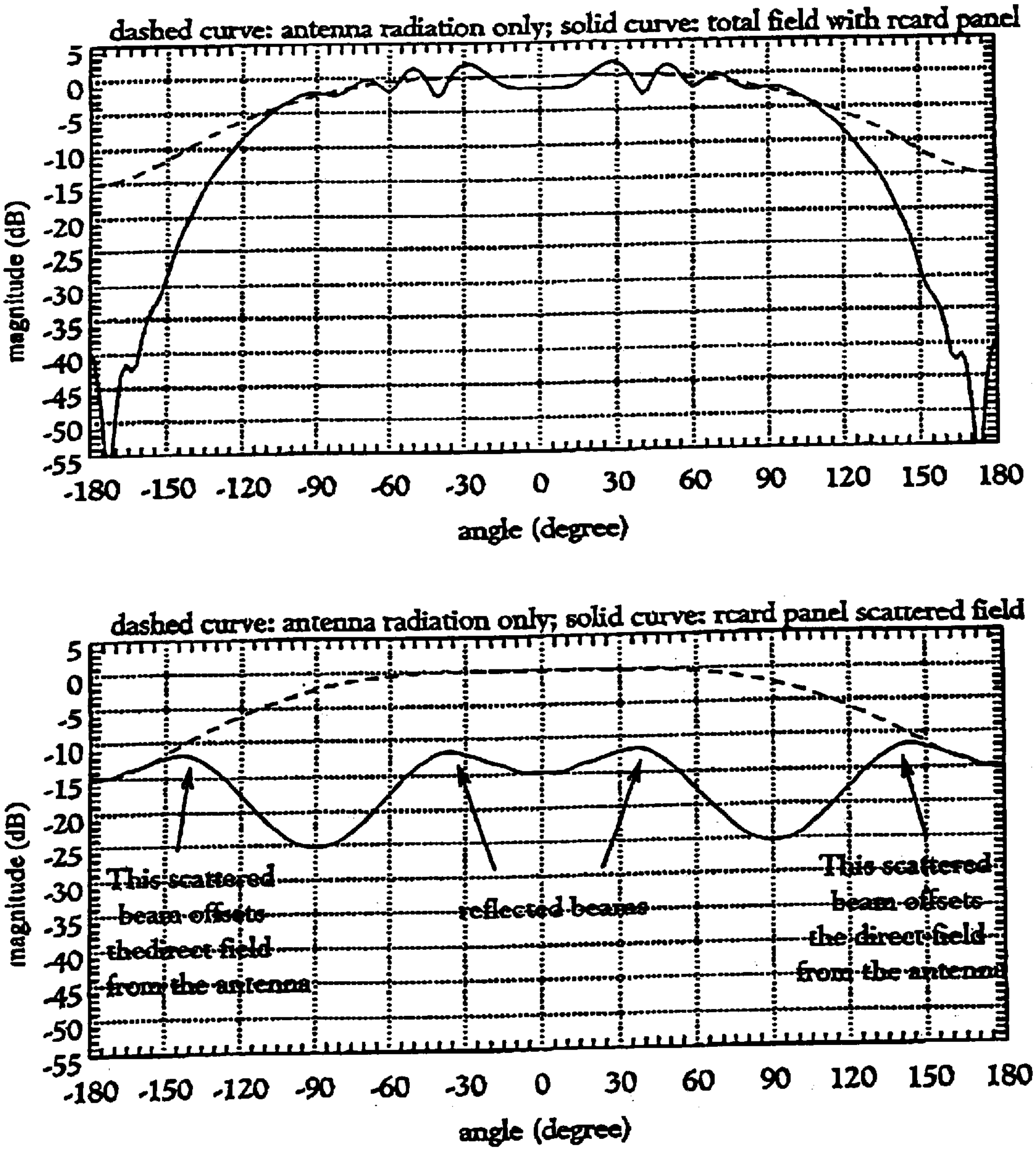
Figure 5. Vertical polarization azimuth plane patterns at 2 GHz using Rcard panel.

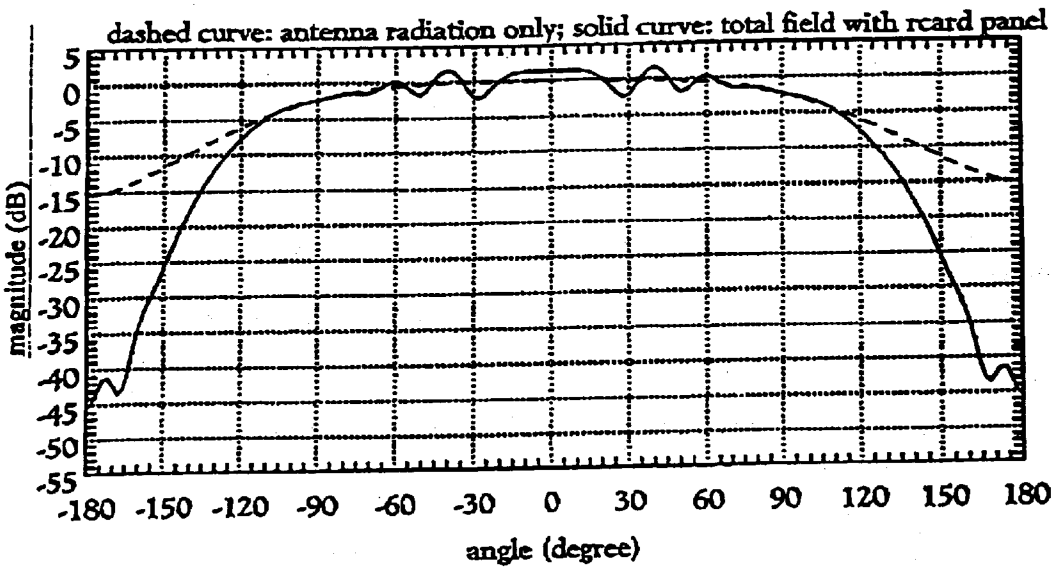
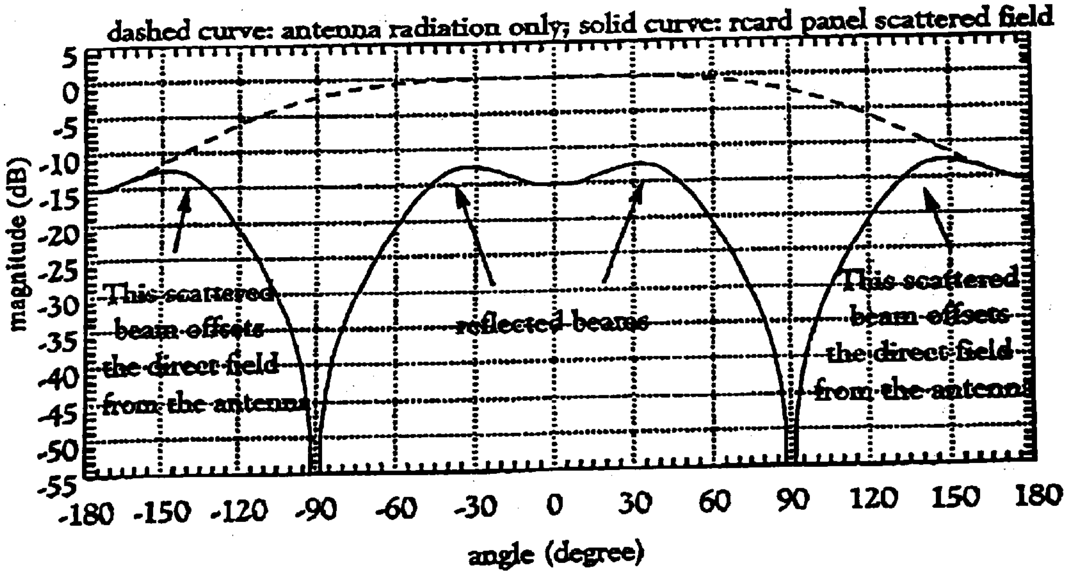
Figure 6. Horizontal polarization azimuth plane patterns at 2 GHz using Rcard panel.

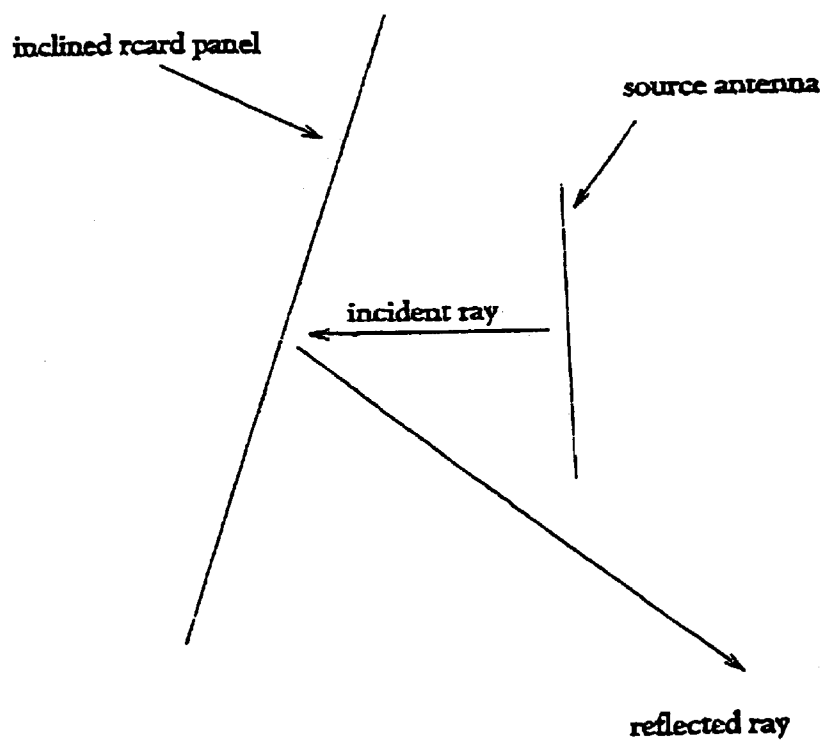
Figure 7. Vertical plane view of an inclined Rcard panel used to reflect the antenna pattern in the vertical plane.

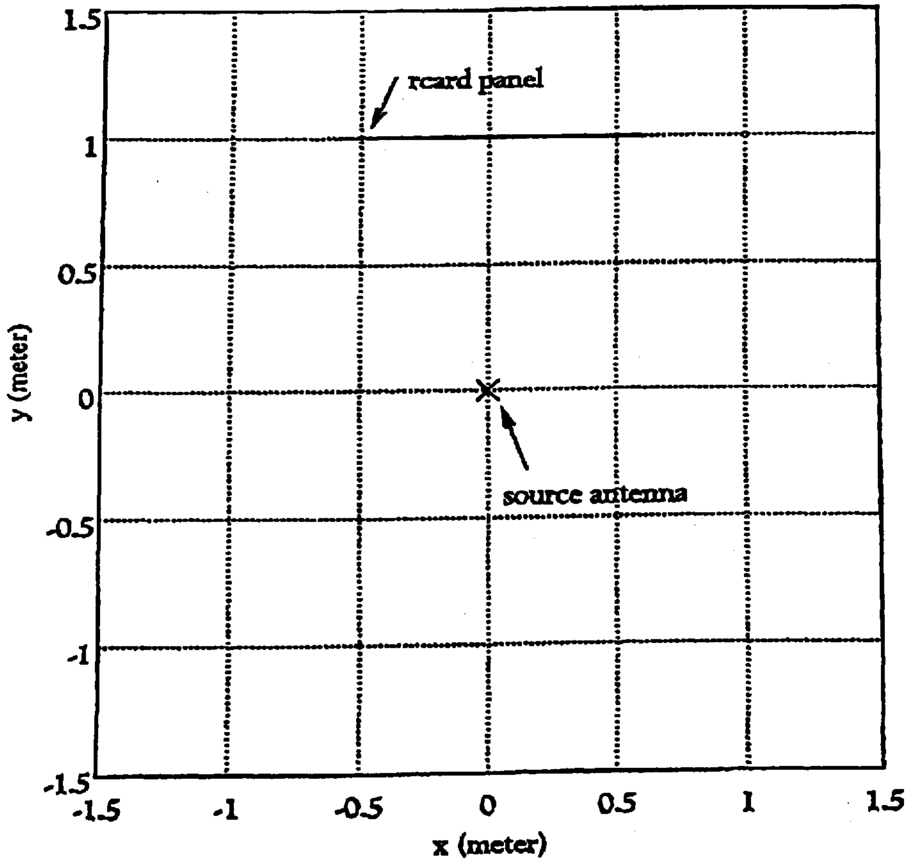
Figure 8. Horizontal plane (xy-plane) view of a 1.2 m wide Rcard panel placed at 1 m to the side of a basestation antenna.

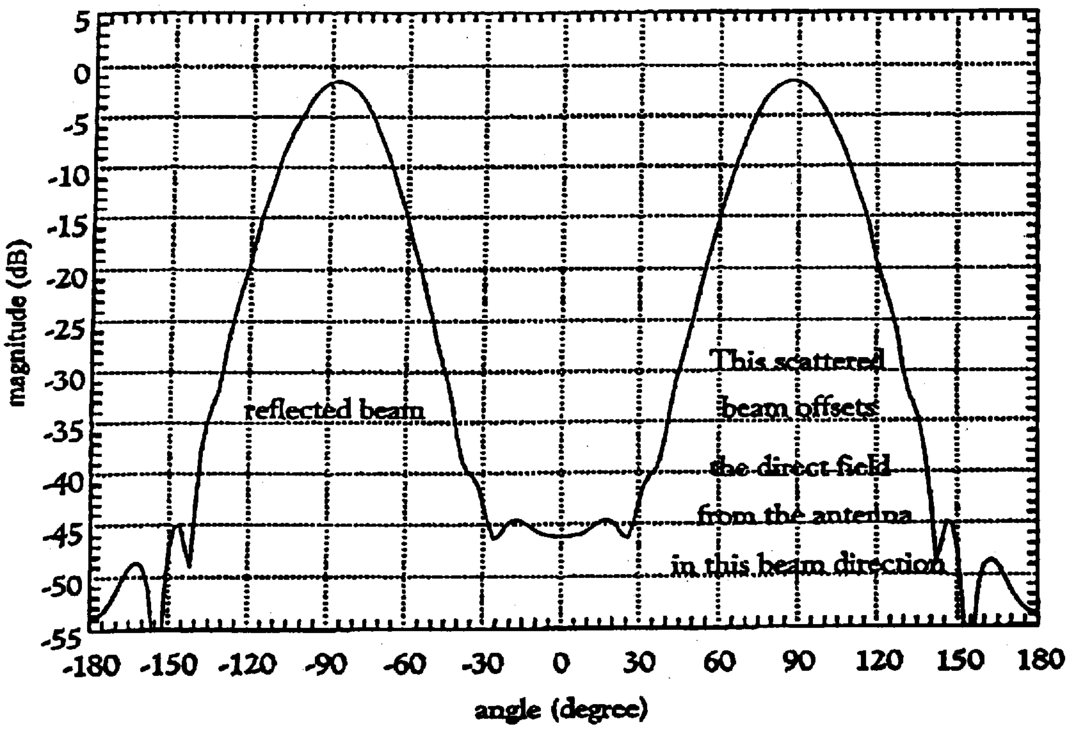
Figure 9. Vertical polarization scattering pattern of the Rcard panel in Figure 8 at 2 GHz.

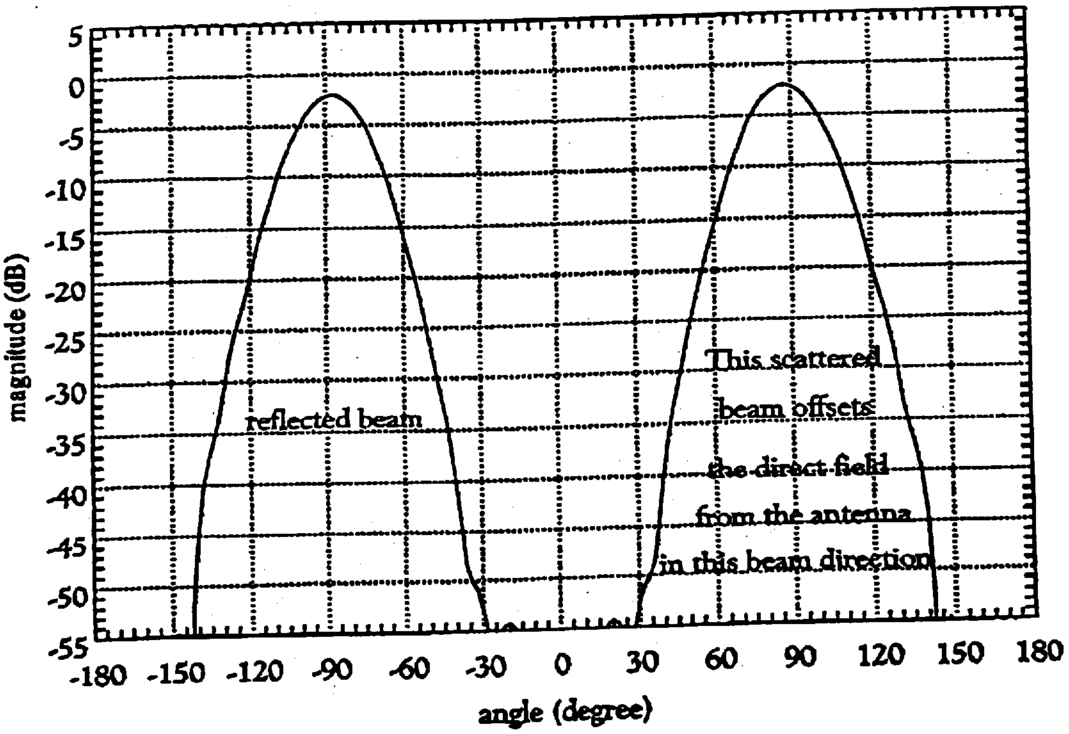
Figure 10. Horizontal polarization scattering pattern of the Rcard panel in Figure 8 at 2 GHz.

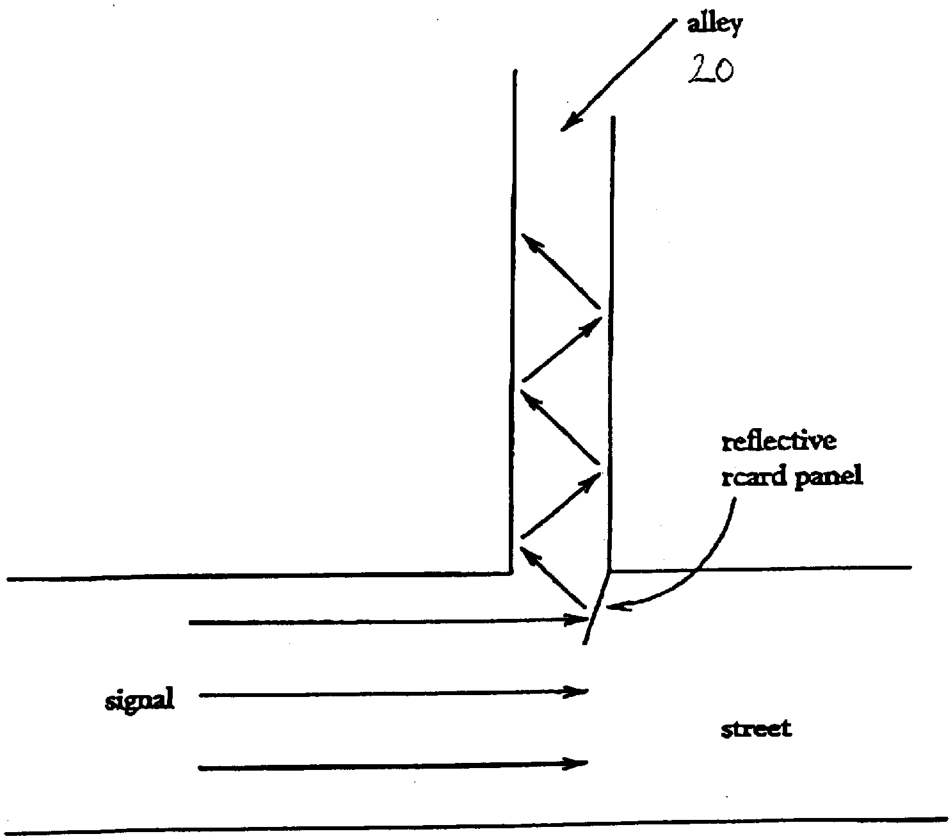
Figure 11. A simple concept of using an Rcard panel to reflect wireless signals streaming down a street into an alley.

REFLECTIVE PANEL FOR WIRELESS APPLICATIONS

This application claims priority to U.S. Provisional Patent Application Serial No. 60/185,440, filed on Feb. 28, 2000.

BACKGROUND AND SUMMARY OF THE INVENTION

Quality of service is a major concern for any wireless system. Since these systems are linked together through an electromagnetic field that propagates from the transmitter to the receiver, one must then be concerned with the transmitting and receiving antennas and the propagation path. The focus in modern wireless systems has been to develop base-station antennas that properly illuminate an assigned sector. Their patterns are rather basic in that they have a standard shape with a wide azimuth beam width and a narrow elevation beam width, which is based on line-of-sight applications. Thus, they function very well in rural applications across open fields. Unfortunately, they suffer performance degradation when used in urban applications in that the buildings block the field of view of both the transmitter and receiver. This results in complex fading illumination of the receiving antenna and reduced quality of service. To overcome this problem, wireless companies and their suppliers have focused on solving this situation by modifying the base station radiators by using dual polarized antennas, multiple space-diversity antennas, smart antennas, etc. These approaches have had some success in providing better performance, but they tend to be expensive and quite complex. As a result, the wireless industry needs a new approach that is not based on the antenna but on the propagation path.

Fundamentally, a wireless system links the transmitter and receiver through a set of complex electromagnetic propagation paths, especially in urban applications. These propagation paths follow the basic ray optical principles of reflection, transmission and diffraction, but in an urban environment, there are multiple paths that interconnect the transmitter and receiver. These multiple paths cause the signal at the receiver to fade in and out. If there is one dominant path, then the difference between the maximums and minimums is relatively small. So one approach to improve performance is to create this situation. The second approach is to deflect undesired paths away from certain areas to remove the interference and create one dominant path. A third way is to create many paths in the same region so that the illumination is so complex that the receiver senses a more stable illumination. There are other concepts, but these illustrate some general approachs that can be used to enhance wireless system performance by modifying the propagation path scenario.

One embodiment of the present invention is a reflective panel for deflecting electromagnetic waves comprised of a resistive material varying in resistivity across the panel; a center portion on the panel, having a predetermined resistivity; a periphery portion on the panel having a higher resistivity than the center portion; and wherein the center portion of the panel is adapted to reflect the electromagnetic waves and wherein the periphery portion is adapted to minimize diffractions.

In addition to the features mentioned above, objects and advantages of the present invention will be readily apparent upon a reading of the following description.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein similar reference characters refer to similar parts and in which:

FIG. 1 illustrates a horizontal plane view of a reflective plate placed behind a wireless base station antenna;

FIGS. 2 and 3 illustrate azimuth plane radiation patterns for vertical and horizontal polarizations;

FIG. 4 illustrates a tapered resistance distribution on a 1.2 wide reflective panel of one embodiment of the invention;

FIGS. 5 and 6 illustrate radiation patterns corresponding to FIGS. 2 and 3;

FIG. 7 illustrates a vertical plane view of an inclined reflective panel;

FIG. 8 illustrates one embodiment of a reflective panel placed to the side of a base station antenna;

FIG. 9 illustrates a vertical polarization scattering pattern of the reflective panel of FIG. 8;

FIG. 10 illustrates a horizontal scattering pattern of the reflective panel of FIG. 8; and FIG. 11 illustrates one embodiment of the invention for deflecting electromagnetic waves down an alley.

DETAIL DESCRIPTION OF PREFERRED EMBODIMENT(S)

The preferred system herein described is not intended to be exhaustive or to limit the invention to the precise forms disclosed. They are chosen and described to explain the principles of the invention, and the application of the method to practical uses, so that others skilled in the art may practice the invention.

One of the major problems associated with electromagnetic propagation modification as proposed here is that electromagnetic fields are always continuous except at sources and boundaries. This means that one cannot simply change one aspect of the radiated field without potentially affecting another region. For example, let's suppose that one wants to use a metal plate to scatter electromagnetic energy away from one region and into another. This plate will obviously reflect the undesired team, but it will also create diffracted fields that will impact the antenna pattern in all other directions. This is illustrated in FIG. 1, which shows the horizontal plane view of a metal plate placed behind a wireless base station antenna. The azimuth plane radiation patterns for vertical and horizontal polarizations at 2 GHz are shown in FIGS. 2 and 3, respectively. The dashed curves in FIGS. 2 and 3 are antenna radiation only, while the solid curves in the top halves of FIGS. 2 and 3 are the total fields, including the scattering by the metal plate, with the latter shown as the solid curves in the bottom halves of FIGS. 2 and 3. Referring to FIGS. 2 and 3, the short duration ripples in the metal plate scattering patterns indicate strong diffracted fields which strongly affect the back radiation direction in that the shadowing by the metal plate is not that significant as shown in the total field patterns. So if one wants to modify the propagation path, a reflective panel must be developed which does not diffract such that the antenna pattern is only modified in the desired direction while the rest of the pattern remains virtually unaffected. This can be achieved using a tapered reflective (Rcard) panel, such as shown in FIG. 4. This panel is composed of resistive material that varies in ohms per square across the panel. The center of the panel has a low resistivity to create the desired reflected field while the periphery has much higher resistivity to minimize diffractions. These panels can be made of continuous tapered resistive material or discrete levels to simulate the desired taper. If the Rcard panel is used in place of the metal plate in FIG. 1, the radiation patterns corresponding to those in FIGS. 2 and 3 are shown in FIGS. 5 and 6, respectively. Note the absence of short duration ripple in the Rcard panel scattering patterns, indicating very weak diffracted fields. Comparing the performances of the metal plate the Rcard panel, it is obvious that the Rcard panel performance is far superior in that very weak diffracted fields are created and the shadowing by the Rcard panel is much more significant. Thus, one can use this new panel to modify the wireless link propagation paths.

To show the significance of this new concept, let's consider a few of the many possible application approaches. In modern wireless systems, the base station radiation coverage area is divided into sectors, each having a fixed beam width in the azimuth plane. The antennas used for these applications have been designed to properly cover the desired sector; however, they also tend to significantly radiate all around the antenna. For example, the back radiation may only be 15 dB below the front radiation. This can cause sector-to-sector interference problems because the back radiation falls in a sector behind the antenna that is used to radiate the same channel code. To correct this situation, one can simply place the Rcard panel behind the interfering antenna 18, as illustrated in FIG. 1 where the metal plate is replaced by the Rcard panel. Note that the Rcard panel back radiation result is reduced by 25 dB as shown in FIGS. 5 and 6, which is very significant. Thus, the channel interference problem can be easily and inexpensively solved. In addition, this Rcard panel can be placed and oriented appropriately behind the antenna to block the back radiation and at the same time reflect this back radiated energy into the desired sector. One would think that this is not a good idea, but that is not true. One can direct this radiation in an urban area to a region where the direct illumination from the base station antenna is rather poor. To better understand this situation, consider that the elevation pattern of the base station antenna is very narrow and boresighted toward or near the horizon to counteract the range loss associated with the link. So in effect, the back radiation is also narrow in the elevation plane and can be reflected by the Rcard panel to create a new elevation pattern peak by simply rotating the panel as shown in FIG. 7. Thus, this new peak can be used to correct illumination problems associated with the direct radiation of the base station antenna. So in this case, the Rcard panel solves two problems at once; i.e., interference and poor direct illumination.

Next, let us look at a typical base station antenna's azimuth pattern such as the dashed curve in FIG. 2. One should note that it is very broad in order to properly illuminate the desired sector which is between +60°. If an Rcard panel is placed off to the side of the base station antenna, it will reflect the side radiation into a new direction. Using the geometry shown in FIG. 8, the Rcard panel blocks the radiation in the 90° (+$\hat{y}$) direction and reflects it into the −90° (−$\hat{y}$) region. To illustrate the directive properties of this panel, the scattering patterns in the azimuth plane are shown in isolation in FIGS. 9 and 10. Note that the scattered field is simply dominated by the reflection component with no significant diffraction energy. So one can place these Rcard panels around a base station antenna to modify the pattern by reflecting energy away from one region to another. This is a very powerful concept because these panels can be accurately positioned to optimize performance based on the site environment. In fact, the complete site design can be easily simulated by using a numerical analysis code such as the NEC Basic Scattering Code. For urban applications this means that one can easily and relatively inexpensively change the base station antenna pattern to accommodate for the environment surrounding the antenna. This will result in a much more optimum performance by adjusting the radiated energy to create the best possible illumination coverage of the desired sector. Thus, the Rcard panel can provide state-of-the-art performance; yet, it is significantly less expensive, vastly simpler to design and install, and much easier to maintain.

The Rcard panels are placed around the base station antenna to modify its pattern to meet the demands of the environment. Because of the versatility of these panels, they can also be used anywhere along the link from the transmitter to the receiver. For example, one can use these panels in an indoor application to reflect energy into a desired direction to correct a poor illumination problem. One concept might be to send a high frequency signal down a long corridor. Since this radiated field is strongly reflected by the sidewalls, it will travel down the corridor with little loss. However, this energy will not tend to propagate into the rooms adjacent to the corridor because the hallway traps the energy. Here again, the Rcard panels can be used to reflect the strong hallway energy into the rooms along the hallway. In fact, one can even have the panels specifically reflect the energy toward a fixed received such as a computer terminal that communicates with the outside world through this wireless link. In other cases, the panel can be used to fill the rooms with energy by using a curved panel so that the mobile system functions well independent of its location within the room. These same concepts can be used outdoors as well where, for instance, the building structure is such that the base station antenna cannot possibly provide the desired illumination. An interesting example might be a small building behind a large building and an alley in between. To get energy into this alley 20, one must reflect the energy with Rcard panels down into this isolated location. This can be done in many ways, but for illustrative purposes, one can envision an concept such as that shown in FIG. 11. The concept being developed here is that one now has a very unique panel that can be used to simply reflect wireless energy around so that the wireless system's quality of service has significantly improved by modifying the propagation paths between the transmitter and receiver.

In summary, this patent disclosure describes a tapered Rcard panel that can be used to create a strong reflected field without significant diffractions. These panels are made of a resistive material that can be continuous or have discrete tapers with low resistivity values in the center and high ones near the edges to minimize the diffractions. These panels can be flat or curved to create the desired reflected field behavior. In other words, a flat panel will simply reflect the incident waveform using the incident field spread factors. A curved panel can be used to create a focused or more focused reflected field. The wireless designer can choose, based on the application, which type of Rcard panel is needed to optimize performance. Again, the Rcard panel layout can be done easily using a high frequency numerical solution, such as the NEC Basic Scattering Code. Thus, the Rcard panels are used to modify the propagation path of the wireless signal by reflecting energy into poorly illuminated areas, which ultimately leads to enhanced quality of service. These panels are very broadband so they can be used simultaneously by multiple wireless systems. Since they are inexpensive and easy to design, install and maintain, they offer an excellent way to improve wireless links either before or after the original system has been installed. Finally, these panels can be integrated into any dielectric structure; however, it is suggested that one integrate them into foam core panels so that the panel support structure does not limit performance. If the Rcard panels are attached to metal, they will be shorted out by the metal and thus become worthless. Since this structure is used to create a reflected field without diffractions, it must be several wavelengths on a side. In broadband applications, this means that the structure should be several wavelengths at the lowest operational frequency.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A system for deflecting electromagnetic waves, comprising:

a reflective panel comprising:

a flat resistive panel varying in resistivity across the panel;

a center portion on the panel, having a resistivity; and a periphery portion on the panel having a higher resistivity than said center portion, wherein said center portion of said panel is adapted to reflect the electromagnetic waves, wherein said periphery portion is adapted to minimize diffractions;

wherein said reflective panel has line of sight communication capability with a first antenna, said reflective panel additionally having line of sight communication capability with a second antenna, wherein said first antenna does not have line of sight communication capability with said second antenna.

2. The system according to claim 1, wherein said flat resistive panel is made of continuous tapered resistive material.

3. The system according to claim 1, wherein said flat resistive panel is made of discrete levels to simulate the desired taper.

4. A system having a reflective panel according to claim 1, wherein the reflective panel is placed behind an interfering antenna to reduce back radiation.

5. A system according to claim 4, wherein the reflective panel is positioned in a predetermined position to deflect the back radiation to a desired wireless sector.

6. A system according to claim 1, wherein said second antenna is in electrical communication with a wireless computer terminal inside a building.

7. A method for directing electromagnetic waves to a second antenna, said method comprising the steps of:

providing a reflective panel, said reflective panel comprised of:

a flat resistive panel varying in resistivity across the panel;

a center portion on the panel, having a resistivity; and a periphery portion on the panel having a higher resistivity than said center portion, wherein said center portion of said panel is adapted to reflect the electromagnetic waves, wherein said periphery portion is adapted to minimize diffractions, wherein said reflective panel has line of sight communication capability with a first antenna, said reflective panel additionally having line of sight communication capability with a second antenna, wherein said first antenna does not have line of sight communication capability with said second antenna; and placing the reflective panel in a predetermined position relative to said first antenna to deflect the electromagnetic waves to said second antenna.

8. A system for deflecting electromagnetic waves, comprising:

a reflective panel, said reflective panel comrpising:

a flat resistive panel varying in resistivity across the panel;

a center portion on the panel, having a resistivity; and periphery portion on the panel having a higher resistivity than said center portion, wherein said center portion of said panel is adapted to reflect the electromagnetic waves, wherein said periphery portion is adapted to minimize diffractions;

wherein the reflective panel is placed behind an interfering antenna to reduce back radiation, and wherein the reflective panel is positioned in a predetermined position to deflect the back radiation to a desired wireless sector.

9. The system according to claim 8, wherein said flat resistive panel is made of continuous tapered resistive material.

10. The system according to claim 8, wherein said flat resistive panel is made of discrete levels to simulate the desired taper.

11. A method for directing electromagnetic waves to a predetermined location, said method comprising the steps of:

providing a reflective panel, said reflective panel comprised of:

a flat resistive panel varying in resistivity across the panel;

a center portion on said reflective panel, having a resistivity; and a periphery portion on the panel having a higher resistivity than said center portion, wherein said center portion of said panel is adapted to reflect the electromagnetic waves, wherein said periphery portion is adapted to minimize diffractions, wherein said reflective panel is placed behind an interfering antenna to reduce back radiation, and wherein the flat reflective panel is positioned in a predetermined position to deflect the back radiation to a desired wireless sector; and placing the reflective panel in a predetermined position relative to said interfering antenna to deflect the electromagnetic waves to the predetermined location.

* * * * *

UNITED STATES PATENT AND TRADEMARK OFFICE

CERTIFICATE OF CORRECTION

PATENT NO. : 6,606,076 B2
DATED : August 12, 2003
INVENTOR(S) : Burnside et al.

It is certified that error appears in the above-identified patent and that said Letters Patent is hereby corrected as shown below:

<u>Column 3,</u>
Line 52, please delete "+60°" and insert -- ±60° --.

Signed and Sealed this

Eleventh Day of November, 2003

JAMES E. ROGAN
*Director of the United States Patent and Trademark Office*